— 2,694,088

Patented Nov. 9, 1954

2,694,088

ALKENOXYBENZAMIDES

Melville Sahyun, John A. Faust, and Leonard H. Jules, Santa Barbara, Calif., assignors, by mesne assignments, to Cutter Laboratories, Inc., Berkeley, Calif., a corporation of California No Drawing. Application June 9, 1952,
Serial No. 292,584

2 Claims. (Cl. 260—559)

The present invention relates to alkenoxy substituted benzamides and is more particularly concerned with the 2-alkenoxybenzamides, which may also be N-substituted.

The novel compounds of the present invention have the following structural formula:

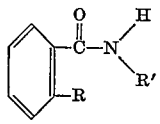

wherein R is selected from the group consisting of alkenoxy and substituted alkenoxy and wherein R' is selected from the group consisting of hydrogen, loweralkyl and cycloalkyl. Among these novel compounds are the 2-(2-propenoxy)benzamide and N-cyclohexyl-2-(2-propenoxy)benzamide members.

An object of the present invention is to provide substituted benzamide compounds possessing valuable therapeutic properties, e. g., central nervous system depressant activity.

It is a further object of the present invention to provide novel 2-alkenoxybenzamide compounds.

Another object of the present invention is to provide novel-2-substituted benzamides which contain other substituents in the N-position, in addition.

Other objects of the present invention will be apparent to those skilled in the art to which this invention pertains.

In novel compounds of the present invention have utility as central nervous system depressants, notably as analgesics and antipyretics. The process of the present invention likewise has utility in producing in good yields these novel substituted benzamides characterized by their pain-relieving qualities.

The starting materials from which these novel benzamide compounds of the present invention are derived are the salicylamides and the N-lower-alkyl or cycloalkylbenzamides. The N-substituted benzamides are conveniently prepared by the reaction of salicylic acid with the appropriate aqueous lower-alkyl or cycloalkyl amine.

The selected starting material is then reacted with the required alkenyl halide, preferably in the presence of potassium iodide and anhydrous potassium carbonate. The reaction mixture is generally permitted to stand at room temperature for several hours and may thereafter be refluxed for varying periods of time. The desired reaction product is then recovered by conventional procedures as illustrated in the accompanying examples.

The alkenoxybenzamides in turn may be reacted with a halogen, such as bromine or chlorine, preferably in carbontetrachloride or other organic solvent, to yield the dihaloalkenoxybenzamides.

The following examples illustrate the products of the present invention but are not to be construed as limiting the same.

Example 1.—2-(2-propenoxy)benzamide

Twenty and six-tenths (20.6) grams (0.15 mole) of salicylamide, 11.5 grams (0.15 mole) of allyl chloride, 24.9 grams (0.15 mole) of potassium iodide (KI), 24.0 grams of anhydrous potassium carbonate and 200 milliliters of dry acetone were admixed and the resulting admixture refluxed for a period of eight and one-half hours. The reaction mixture was then distilled to remove most of the solvent, the residue was poured into water and the mixture was made alkaline with dilute sodium hydroxide solution. The separated solid was collected and recrystallized from dilute isopropanol to yield 22.1 grams (an eighty-three percent yield) of 2-(2-propenoxy)benzamide, melting at 97–98 degrees centigrade. The product was less than 0.5 percent soluble in water at twenty degrees centigrade and was approximately ten percent soluble in propylene glycol. The molecular weight was 177.20.

Analysis.—Calculated for $C_{10}H_{11}N_2$: N 7.90. Found: 7.78.

In like manner, other 2-alkenoxybenzamides, such as 2-(3-butenoxy)benzamide and 2-(4-pentenoxy)benzamide, can be prepared by reacting salicylamide with the appropriate alkenyl halide in the presence of potassium iodide and anhydrous potassium carbonate.

Example 2.—N-cyclohexyl-2-(2-propenoxy)benzamide

Twenty-one and nine-tenths (21.9) grams (0.1 mole) of N-cyclohexylsalicylamide, 13.3 grams (0.01 mole) of allyl bromide, 16 grams of anhydrous potassium carbonate and 100 milliliters of dry acetone were admixed and the resulting admixture permitted to stand at room temperature for sixteen hours, at the end of which time it was then refluxed for seven hours. Sufficient water was added to dissolve the inorganic solids and the mixture was extracted with ether. The combined ether extractions were washed with successive 100-milliliter portions of dilute sodium hydroxide solution and water, respectively, and dried over magnesium sulfate. Removal of the ether by distillation left an orange, oily residue which solidified upon further standing. The resulting residue was dissolved in ethanol, the resulting solution then treated with charcoal and subsequently diluted with water. Sixty grams, a 61 percent yield, of white needles of N-cyclohexyl-2-(2-propenoxy)benzamide, melting at 79–80 degrees centigrade, separated from the aqueous solution. The product exhibited solubility of less than 0.5 percent in water, approximately ten percent in propylene glycol, and was soluble in ether, chloroform and carbon tetrachloride. The pH of a saturated solution was 6.7 and the molecular weight was 259.34.

Analysis.—Calculated for $C_{16}H_{21}NO_2$: N 5.40. Found: 5.39.

In like manner, N-cyclohexyl-2-(3-butenoxy)benzamide, N-cyclohexyl-(5-hexenoxy)benzamide and other N-cyclohexyl-2-alkenoxybenzamides are prepared by reacting cyclohexylsalicylamide with the appropriate alkenyl halide according to the procedure of this example.

Likewise, other N-substituted alkenoxybenzamides, such as N-methyl-2-(2-propenoxy)benzamide, N-ethyl-2-(2-propenoxy)benzamide and N-methyl-2-(3-butenoxy)benzamide can be prepared by employing the appropriate N-alkylsalicylamide starting compounds.

Example 3.—N-cyclohexyl-2-(2,3-dibromopropenoxy)-benzamide

To a solution of 5.2 grams (0.02 mole) of N-cyclohexyl-2-(2-propenoxy)benzamide, obtained according to the procedure of Example 2, in 25 milliliters of carbon tetrachloride was added a solution of 3.2 grams (0.02 mole) of bromine in carbon tetrachloride. The color rapidly disappeared from the resulting admixture, an orange oil then separating. The reaction mixture was permitted to stand overnight at room temperature, the solvent then removed by distillation and the resulting residue dissolved in ether. The ethereal solution was extracted with dilute sodium bisulfite, the orange color disappearing and the ether was distilled off, leaving a crude product as the residue. Recrystallization from dilute isopropanol solution gave 6.3 grams (75 percent yield of the theoretical) of N-cyclohexyl-2-(2,3-dibromopropenoxy)benzamide, melting at 95–96 degrees centigrade.

Analysis.—Calculated for $C_{16}H_{21}Br_2NO_2$: N 3.34. Found: 3.36.

Pharmacological studies in animals of the analgesic potency were conducted using the 2-(2-propenoxy)-benzamide and the N-cyclohexyl-2-(2-propenoxy)benzamide members selected from the compounds of the present invention. The following data was obtained, employing the known analgesics, acetyl salicylic acid and salicylamide, as reference compounds:

TABLE I

| Compound | Lethal Dose-50 | Analgetic | | Therapeutic Index, $LD_{50}/ED_{50}$ |
| --- | --- | --- | --- | --- |
| | | Dose (Effective) | Degree | |
| Acetyl Salicylic Acid | 500 | 350 | Slight | 1.4 |
| Salicylamide | 600 | 175 | ____do____ | 3.0 |
| 2-(2-Propenoxy)-benzamide | 250 | 60 | Pronounced | 4.0 |
| N-Cyclohexyl-2-(2-propenoxy)benzamide | 1,500 | 300 | ____do____ | 5.0 |

These data, representing approximate evaluations, were derived from rat studies, in which the intraperitoneal toxicity and analgetic potency were determined, the dosage in each instance being expressed in relative measures as milligrams per kilogram of body weight. Analysis of these results shows the compounds of the present invention to compare very favorably in terms of analgetic potency and in terms of therapeutic index with both acetyl salicylic acid and salicylamide, compounds well known as analgesics and antipyretics.

Various modifications may be made in the products of the present invention without departing from the spirit or scope thereof and it is to be understood that we limit ourselves only as defined in the appended claims.

We claim:
1. A compound of the formula:

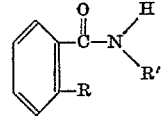

wherein R is lower alkenoxy and R' is cyclohexyl.

2. N-cyclohexyl-2-(2-propenoxy)benzamide.

References Cited in the file of this patent

Beilstein's "Organische Chemie," vol. X, 2nd supplement (1949), page 58.